United States Patent
Sako et al.

(10) Patent No.: US 6,738,752 B2
(45) Date of Patent: *May 18, 2004

(54) INFORMATION DISTRIBUTING APPARATUS AND INFORMATION DISTRIBUTING METHOD, INFORMATION RECEIVING APPARATUS AND INFORMATION RECEIVING MET

(75) Inventors: Yoichiro Sako, Tokyo (JP); Shuichi Ito, Tokyo (JP); Tatsuya Inokuchi, Kanagawa (JP); Masayuki Obata, Tokyo (JP); Kazuko Sakurai, Chiba (JP)

(73) Assignee: Sony Corporation, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 3 days.

(21) Appl. No.: 09/400,506

(22) Filed: Sep. 21, 1999

(65) Prior Publication Data

US 2002/0128936 A1 Sep. 12, 2002

(30) Foreign Application Priority Data

Sep. 22, 1998 (JP) .......................... 10-268482

(51) Int. Cl.[7] .............................................. G06F 17/60
(52) U.S. Cl. ............................. 705/400; 705/34; 725/5
(58) Field of Search ................. 705/1, 26, 27, 705/34, 52, 54, 77–79, 400; 725/5–8; 369/84, 85

(56) References Cited

U.S. PATENT DOCUMENTS 4,484,217 A    11/1984  Block et al.
5,130,792 A  *  7/1992  Tindell et al. ......... 379/100.09
5,418,713 A  *  5/1995  Allen ........................... 705/32
5,592,511 A  *  1/1997  Schoen et al. ............... 375/220
5,636,276 A  *  6/1997  Brugger ....................... 705/52
5,675,734 A  * 10/1997  Hair ........................ 379/93.12
5,734,719 A  *  3/1998  Tsevdos et al. ............. 700/234
5,790,172 A  *  8/1998  Imanaka ..................... 725/100
6,119,109 A  *  9/2000  Muratani et al. ........... 705/400
6,144,702 A  * 11/2000  Yurt et al. ................. 348/384.1
6,202,056 B1 *  3/2001  Nuttall ........................ 705/44
6,249,865 B1 *  6/2001  Walker et al. ................ 705/26
6,263,313 B1 *  7/2001  Milsted et al. ................ 341/51
6,275,988 B1 *  8/2001  Nagashima et al. ........ 380/200
6,330,490 B1 * 12/2001  Kim et al. ................... 700/234

FOREIGN PATENT DOCUMENTS

| EP | 0 696 121  | 2/1996 |
| EP | 0 715 243  | 6/1996 |
| EP | 0 766 475  | 4/1997 |
| FR | 2 760 584  | 9/1998 |
| WO | WO 96 12256 | 4/1996 |
| WO | WO 97 29584 | 8/1997 |

OTHER PUBLICATIONS

*Interactivity* article "An Interactive Developers' Guide to Sounds for Sale, Rent or License", dated Oct. 1997.*

Patent Abstracts of Japan vol. 014, No. 561 (P–1142), Dec. 13, 1990 & JP 02 240710 A (NEC Corp), Dec. 25, 1990.

* cited by examiner

*Primary Examiner*—Dean J. Kramer
(74) *Attorney, Agent, or Firm*—Frommer Lawrence & Haug LLP; William S. Frommer (57) ABSTRACT

An information distributing apparatus and method wherein value standards of content information to be distributed to a user exhibit different usage values distinguished by a trait of the content information and selectable by the user. Billing for receipt of the information is based on the value standards, and the content, standards and billing information are distributed to the user.

14 Claims, 10 Drawing Sheets

INFORMATION DISTRIBUTING APPARATUS AND INFORMATION DISTRIBUTING METHOD, INFORMATION RECEIVING APPARATUS AND INFORMATION RECEIVING MET

BACKGROUND OF THE INVENTION

1. Field of the Invention

The present invention relates to an information distribution apparatus and an information distribution method with respect to a billing method at a time of distributing information, an information receiving apparatus and an information receiving method, and an information receiving and distributing method.

2. Description of the Related Art

In recent years, various kinds of information (hereafter, referred to as contents) are in circulation with the advance of the multimedia industry. These contents have come to be provided by way of, for example, a communications satellite, radio communication, cable communication such as CATV (the cable television) and an information distribution service (hereafter, referred to as service) using the internet and the like. With the service, a so-called predetermined billing has been carried out corresponding to the provided contents. With a conventional service, music information and image information as part of audio information and video information are transmitted to a user on the receiving side (hereafter, referred to as user) with a predetermined format. At this time, although there has been a service whereby to reflect a difference in transmission systems of contents data as to whether the contents are transmitted by an analog system or a digital system on the amount of billing, sound quality, image quality and genre (classification) of these music information and image information have never been reflected on the above-mentioned amount of billing and as a result, the amount to be billed has been fixed.

However, a preference of the user is diverse, which means that there is a case where a user does not care about a quality of some contents, but wants them to be provided cheaply, or a case where the user wants to be provided the highest quality of other contents however expensive they are. Therefore, with the conventional service, it is impossible to answer these requests under the present circumstances.

SUMMARY OF THE INVENTION

Therefore, an object of the present invention is to solve the above-mentioned problems and propose an information distribution apparatus and an information distribution method, an information receiving apparatus and an information receiving method, and an information receiving and distributing method which are capable of carrying out the billing of the side to which information is provided based on a value standard for the provided information.

According to an aspect of the present invention, there is provided an information distributing apparatus for billing and distributing information, which is characterized by comprising an adding means for adding a value standard to said information based on a predetermined standard, a billing means for carrying out a billing based on said value standard for said information, and a distributing means for distributing said information billed by said billing means.

According to the present invention, in the information distributing apparatus, the adding means adds the value standard to the information based on the predetermined standards. The value standard added to the information by the adding means is referred to at a time of billing the information distributed by the distributing means. The billing means bills the information based on the value standard.

BRIEF DESCRIPTION OF THE PREFERRED EMBODIMENTS

DESCRIPTION OF THE PREFERRED EMBODIMENTS

Hereafter, suitable embodiments of the present invention will be explained with reference to attached drawings.

Meanwhile, the embodiments to be explained in the following are, since they are suitable concrete examples of the present invention, attached with various kinds of technologically suitable limitations, but the scope of the present invention is not limited to these embodiments unless there are any statements to the effect that the following explanations particularly limit the present invention.

In the following explanations, "a value standard" means a high and a low of a value for using information which is distinguished by quality and class and "quality" is, in terms of image information, a degree of definition of image and in terms of audio information, goodness of sounds at a time of reproduction, and "classes (value, genre)" indicate, for example, in terms of music information, ones such as classic music, popular music and the like and in terms of image information, movies, CG (Computer Graphics), a still image and the like and "contents (information)" indicate substance, contents and accommodated information of music information and image information as part of audio information and video information respectively. Hereafter, the contents will be explained with music information mainly as one example.

Figure 1:
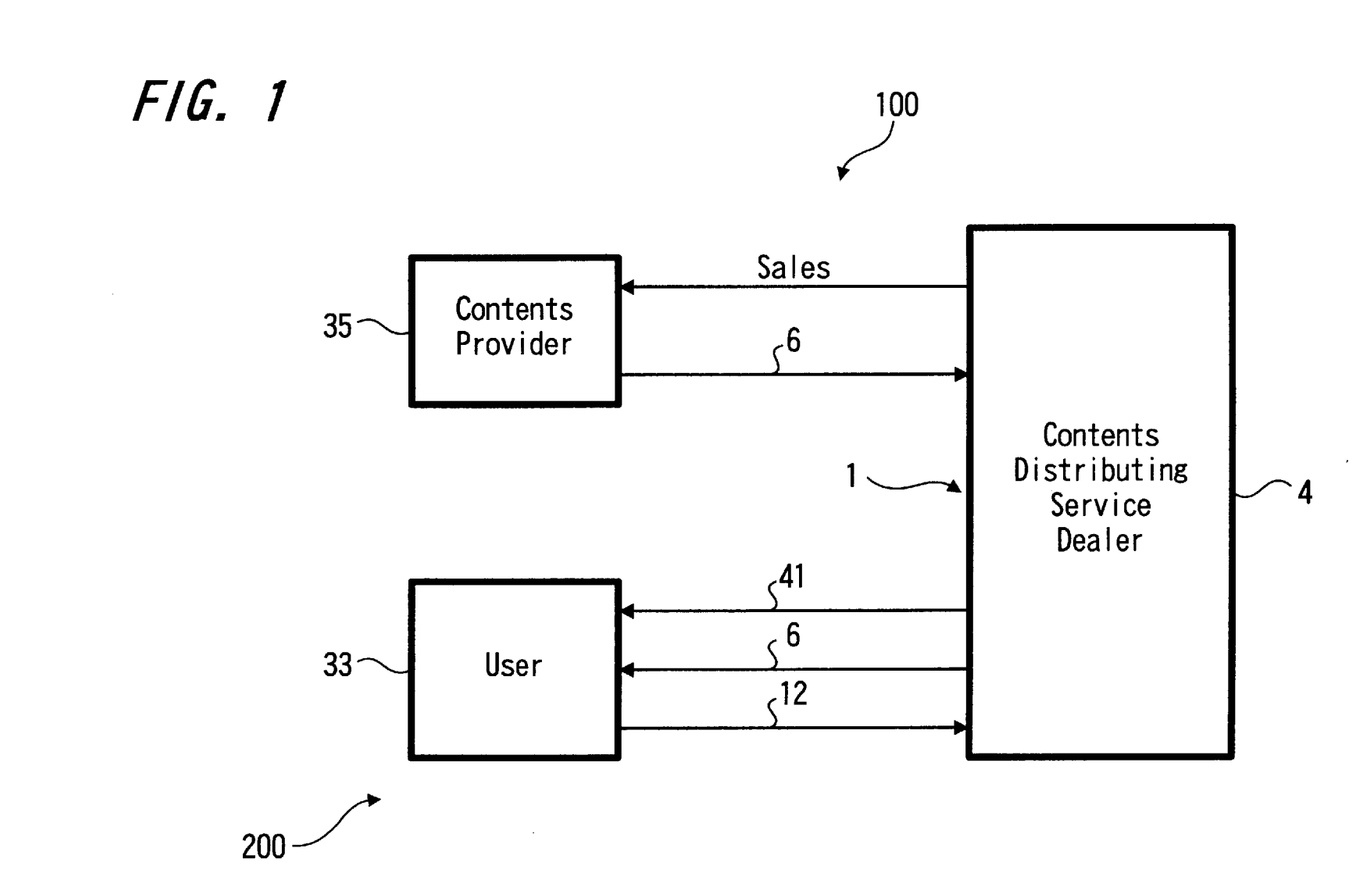
FIG. 1 is an image diagram of an information receiving and distributing system including an information distributing apparatus as a favorable embodiment of the present invention.

FIG. 1 is an imaginary diagram of an information receiving and distributing system including an information distributing apparatus as a suitable embodiment of the present invention.

An information receiving and distributing system 100 (information receiving and distributing apparatus) is comprised of, for example, a contents provider 35, a contents distributing service dealer 4 and a user 33. The information receiving and distributing system 100 is a system for obtaining music from one (the contents provider 35 in FIG. 1) who wants to provide the music and the like, and widely distributing the music to a third party (a user 33 in FIG. 1).

The above-mentioned contents provider 35 is one and the like who, for example, compose music and want to provide the music composed by themselves to the third party. The contents provider 35 registers contents data 6 (audio information and video information) such as, for example, the music and the like composed by himself with the contents distributing dealer 4.

The contents distributing service dealer 4 receives the music and the like which the contents provider 35 wants to register. The contents distributing service dealer 4 provides a desired piece of music to a user 33 who wants to listen to the music from among a lot of accumulated music and the like. The contents distributing service dealer 4 distributes information by, for example, an information distributing apparatus 1 (a part of the information receiving and distributing apparatus) to be explained later in FIG. 4 to an information receiving apparatus 200 to be explained later, which the user 33 operates.

Figure 2:
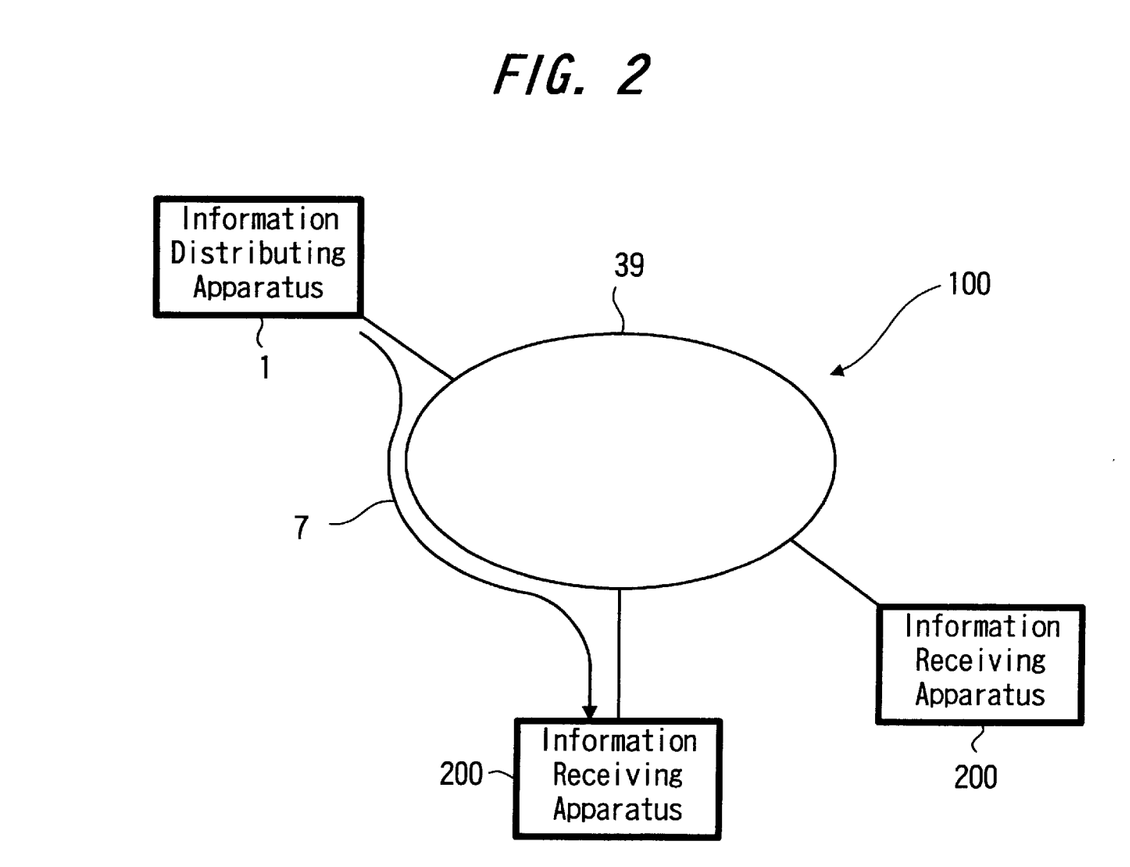
FIG. 2 is a diagram showing an example of an arrangement of the information receiving and distributing system in FIG. 1.
Figure 3:
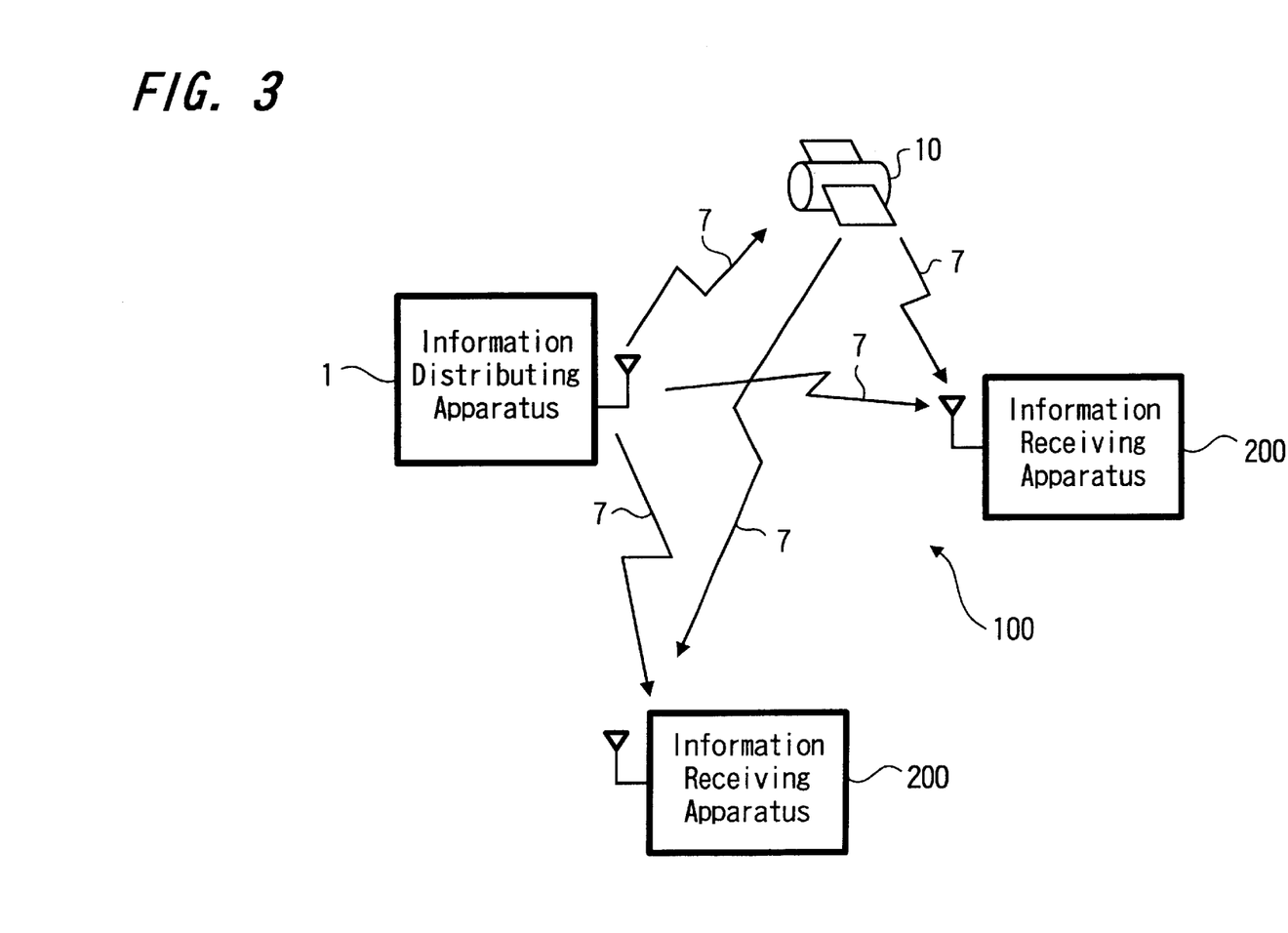
FIG. 3 is a diagram showing an example of an arrangement of the information receiving and distributing system in FIG. 1.

When information on music and the like are provided by the contents distributing service dealer 4, such a system may be used which uses cable communication such as a network 39 as in FIG. 2 or radio communication as in FIG. 3, alternatively a combination of these two. As an example of using the cable communication, there is a mode such as utilizing the internet as one example of the network 39 in FIG. 2, CATV (Cable Television, however, this is a case of distributing the image information and the like), ATM (Asynchronous Transfer Mode) communication and the like, and as an example of utilizing radio communications, there is a mode such as using a communication satellite 10 in FIG. 3, a ground wave broadcast and the like. Meanwhile, needless to say, the above-mentioned modes may be combined. In the following explanation, an example of an arrangement of the information distributing and receiving system 100 will be explained on condition that the internet is used as, for example, the network 39.

Figure 4:
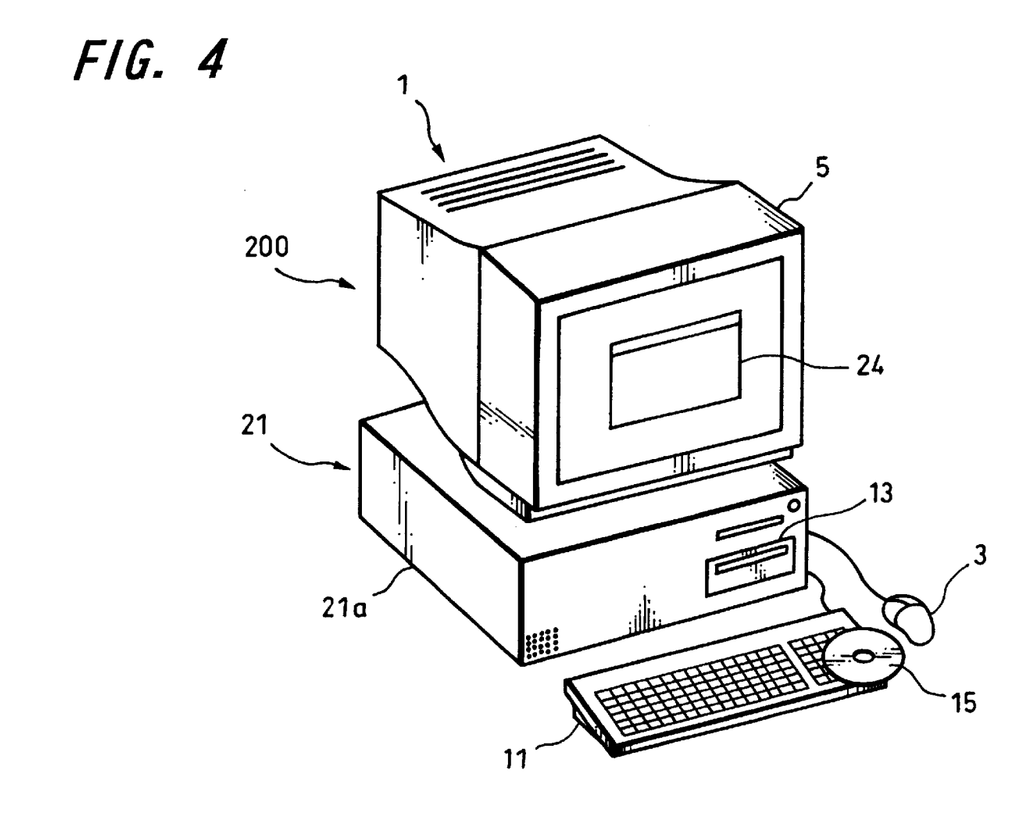
FIG. 4 is a diagram of an arrangement of hardware showing a concrete example of the information distributing apparatus in FIG. 1.

FIG. 4 is a block diagram of an arrangement of hardware showing a concrete example of an arrangement of the information distributing apparatus in FIG. 1. Meanwhile, since an information distributing apparatus 1 is a computer (so-called personal computer is also preferable) capable of, for example, high speed processing and since an information receiving apparatus 200 is a computer such as, for example, a personal computer, a portable information terminal and the like, or its one kind, they are respectively deemed to have nearly similar arrangements. An example of the arrangement of the information receiving apparatus 200 will be explained later.

The information distributing apparatus 1 is, as explained above, for example, a computer 21. The computer 21 is provided with an environment (for example, a network substrate, a network cable, other drive software and the like) for connecting to the network 39 to be not graphically shown, and comprises a main body 21a having a control unit and the like such as a central processing unit (CPU) and the like, a disc apparatus 13 provided in the main body 21a, a pointing device 3, a displaying unit 5 and a key board 11.

The computer 21 is provided with the disc apparatus 13 capable of at least reading out information from, for example, an information recording medium 15. The information recording medium 15 is, for example, a compact disc (CD-ROM), a flexible disc (floppy disc) and the like.

Figure 5:
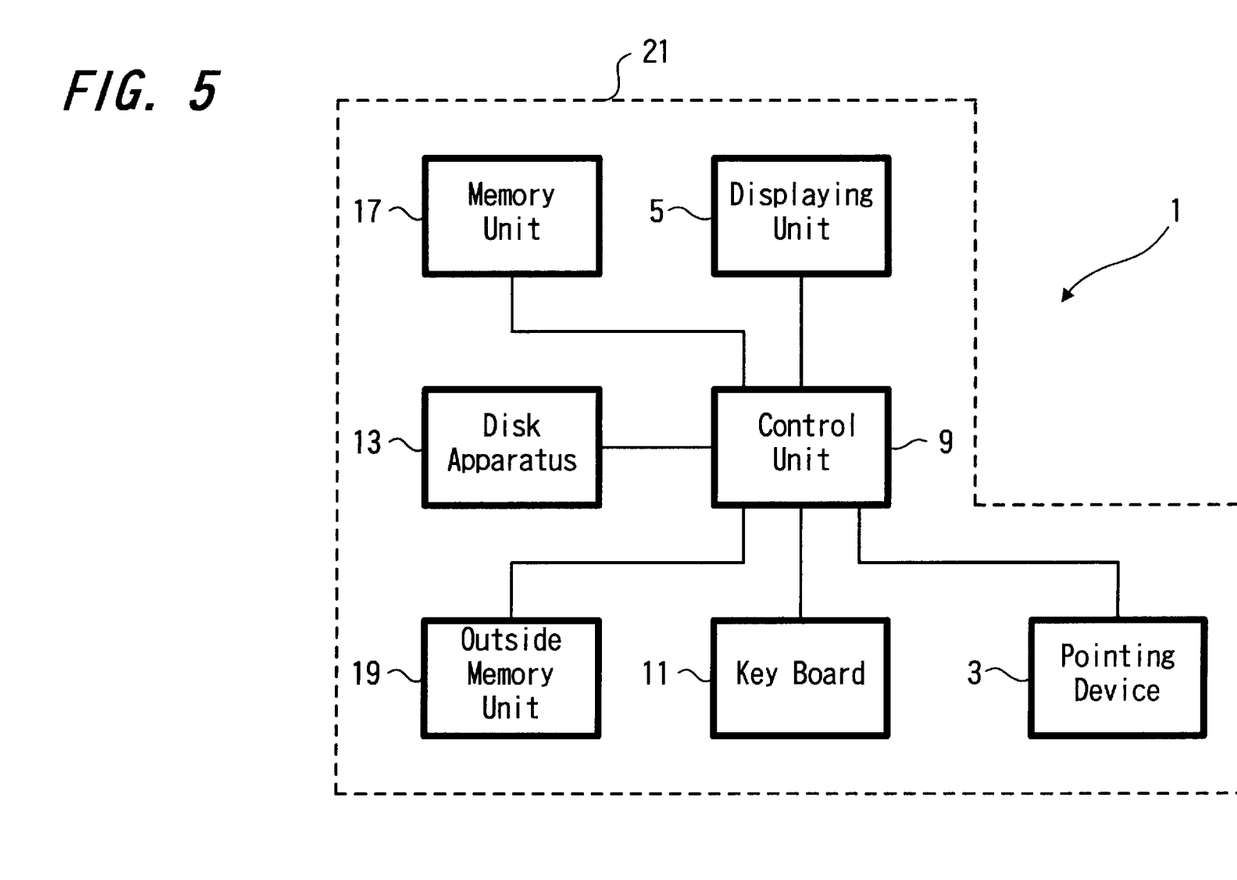
FIG. 5 is a block diagram showing an example of a simplified electric arrangement of a computer in FIG. 4.

FIG. 5 is a block diagram showing an example of a simplified electric arrangement of the computer in FIG. 4.

The computer 21 comprises a control unit 9, the displaying unit 5, a memory unit 17, the disc apparatus 13 and a an outside memory unit 19 and preferably, the pointing device 3, and the key board 11.

The above-mentioned control unit 9 is connected with, for example, the displaying unit 5, the memory unit 17, the disc apparatus 13 and the outside memory unit 19, and preferably with the pointing device 3 and the key board 11. The control unit 9 is one for controlling each of the above-mentioned connected blocks. The control unit 9 stores software in such as the outside memory unit 19, for example, a hard disc and the like and carries our the software by making the memory unit 17 such as, for example, RAM (Random Access Memory) or the like as an operating area when a necessity arises.

The above-mentioned displaying unit 5 is a displaying device of, for example, a CRT (Cathode Ray Tube) and a liquid crystal display. The above-mentioned pointing device 3 is an operating means, for example, like a mouse of the computer 21.

The above-mentioned key board 11 is an operating unit of the computer 21, provided for operation and so on of the computer 21 instead of the pointing device 3 for an unaccustomed learner of, for example, the pointing device 3. Meanwhile, in the information distributing apparatus 1 (and the information receiving apparatus 200), since the distribution of information is automatically carried out, the key board 11 and the pointing device 3 are not necessary in an ordinary operation.

Figure 6:
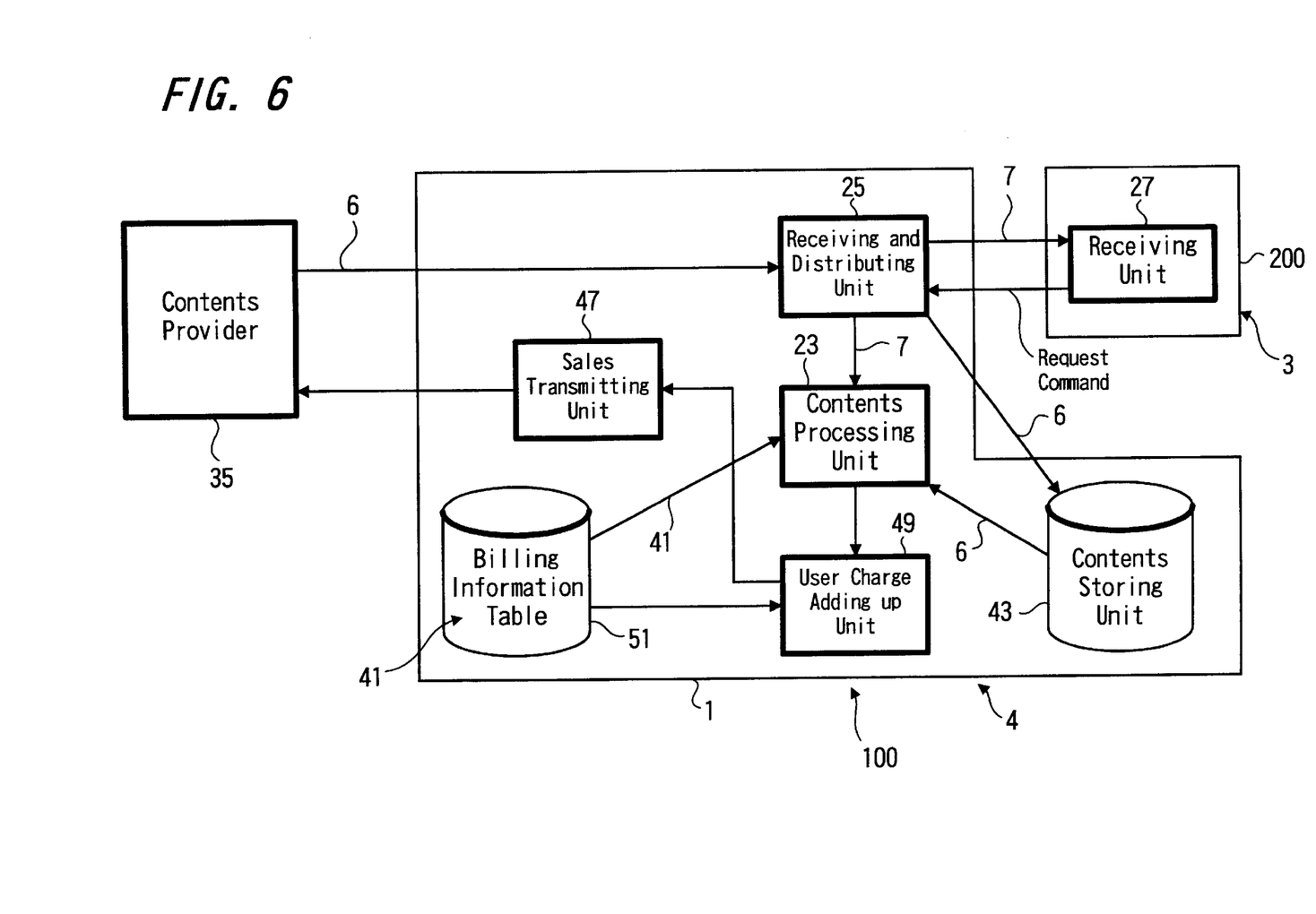
FIG. 6 is a diagram of an arrangement of software showing an example of a concrete processing of the information receiving and distributing system in FIG. 1.

FIG. 6 is a diagram of an arrangement of the software showing a concrete example of processing by the information receiving and distributing system in FIG. 1.

The contents provider 35, in order to register with the contents distributing service dealer 4 to provide, for example, the music he has composed to a third party, registers the contents data 6 with the information distributing apparatus 1 provided at the contents distributing service dealer 4.

The information distributing apparatus 1 comprises a receiving and distributing unit 25 (distributing means), a contents storing unit 43, a billing information table 51, a contents processing unit 23 (a adding means, a billing means), a usage rate adding up unit 49 and a sales transmitting unit 47.

The above-mentioned receiving and distributing unit 25 receives the contents data 6 provided by the contents provider 35 and stores them in the outside memory unit 19 of FIG. 5, which is, for example, a hard disc. The contents data 6 are, for example, when they are music information, stored in data formats such as a CD-DA (Compact Disc-Digital Audio) format, an ATRAC (Adaptive Transform Acoustic Coding) format (an ATRAC 2 can be employed otherwise), a MIDI (Musical Instrument Digital Interface) format, a WAV (WAVe) file and the like. The contents data 6 are, for example, when they are the image information, stored in data formats like, for example, an MPGE 2 (Moving Picture Experts Group 2) format (MPEG 1, 4, 7 can be employed otherwise), a JPEG (Joint Photographic Experts Group) format, a BMP (BitMap) format, a GIF (Graphic Interchange Format) and the like.

Figure 7A:
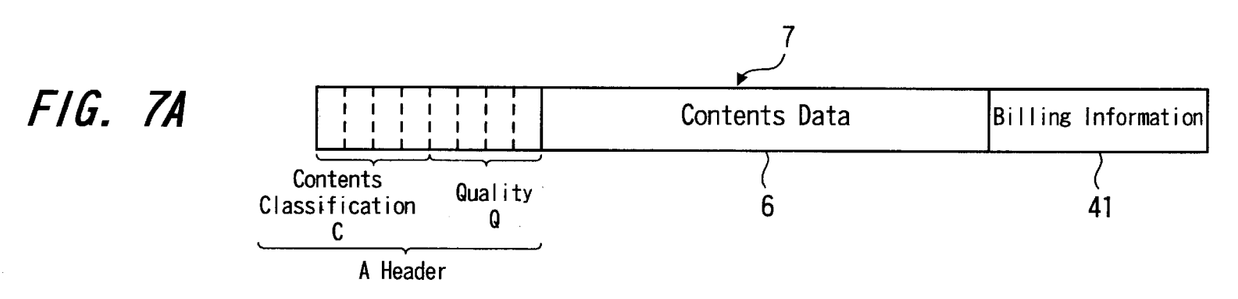
FIG. 7 is a diagram showing an example of an arrangement of contents distributing data and a billing information table in FIG. 6.

The above-mentioned billing information table 51, when the contents processing unit 23 distributes information to the information receiving apparatus 200, which will be explained later, stores billing information in the distributed contents data 6 as basic data for carrying out the billing commensurate with its value. The billing information data 41 comprises, for example, as shown in FIG. 7(B), a quality divisions table and, as shown in FIG. 7(C), a contents classification table.

Figure 7B:
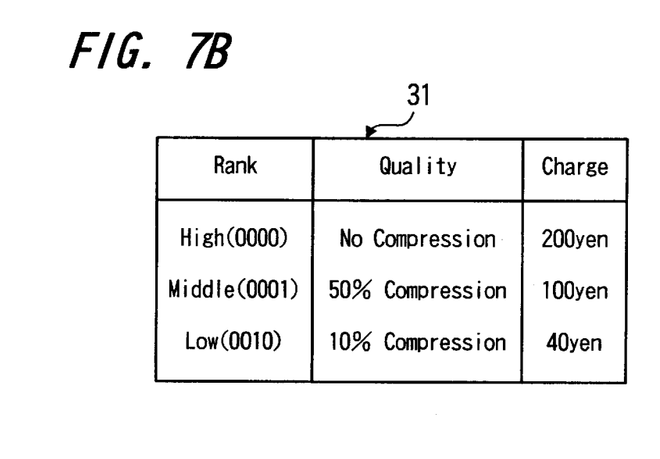
Figure 7C:
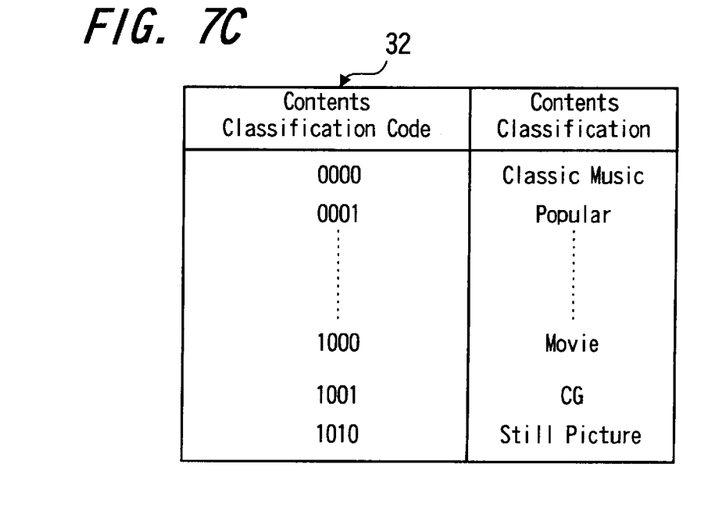

A quality divisions table 31 in FIG. 7(B) is a table to stipulate a division (a value standard) in terms of the quality of the information distributed to, for example, the information receiving apparatus 200. The quality divisions table 31 has data on a rank, quality and a rate, for example, of every data. Here, as one example of the "quality", for example, in a case of voice information, a system based on a compression rate of the contents 6 (to show data about to what extent original data is compressed), a transmission speed, a highest reproduction frequency and the number of bits per sample bit is cited and in a case of, for example, image information, a system based on the compression rate of the contents 6 (to show data about to what extent original data is compressed), the transmission speed, resolution/the number of pixels and the like is cited.

That is, since the not-much compressed (for example, in FIG. 7(B), not compressed) contents data 6 can reproduce the sounds as they are, the rate is set expensive (when the value standard is high, the usage rate is expensive) while since much-compressed (for example, in FIG. 7(B), compressed-by-10%) contents data 6 can not be correctly reproduced, the rate is set inexpensive (when the value standard is low, the usage rate is made inexpensive). Therefore, the quality classifications table 31 stores billing information in order to carry out the billing in accordance with the quality of the distributed contents data 6. Meanwhile, the standards for the classifications are not limited to the degrees of the compression, but various standards such as a compression system and the like can be employed. Generally, when the compression systems are the same, the degree of the compression corresponds to the value standard, but when the compression systems are different, even when the degree of the compression is large, there is a case where the value standard becomes high, so it is necessary to pay attention to adopting the standard.

As one example of the quality classifications, in a case of music information, there are a compact disc sound quality level, an FM (Frequency Modulation) radio broadcast sound quality level, a mini-disc sound quality level, a cassette tape sound quality level and the like for every sound quality. In a case of image information, for example, in a reproduced video image, there are a DVD (Digital Video Disc) image quality level, an S-VHS (Super-Video Home System) image quality level, a VHS (Video Home System) image quality level or the like and for example, in a case of Television broadcast image quality, there are a high-vision image quality level, an NTSC (National Television System Committee) image quality level and the like. That is, with the information distributing apparatus 1, although the contents data 6 are the same, there is a case in which the billing becomes different depending on the quality. The information distributing apparatus 1 has the user make a selection from a plurality of the qualities, thereby carrying out the billing on the receipt of the contents data 6.

The information distributing apparatus 1, at a time of distributing, for example, digitalized contents data 6, may preferably bill and distribute based on a bit rate (the transmission speed in a case of real-time reproduction (one-fold speed)).

The contents classifications table 32 in FIG. 7(C) is a table which prescribes a division (value standard) of a class of the contents data 6 distributed to, for example, the information receiving apparatus 200. The contents classification table 32 stores the billing information for carrying out different billings depending on the contents of the contents data 6 distributed to the information receiving apparatus 200. That is, the contents classification table 32 stores divisions of contents classification codes and the contents classifications which fit into them, for example, in a case of music information, classic music, popular music or music of other genres and the like while in a case of image information, movies, divisions of CG (Computer graphics), a still image and the like.

The above-mentioned contents processing unit 23 processes the contents data 6 in response to a demand from, for example, the information receiving apparatus 200 to produce contents distributing data 7 (information) and transmits the contents distributing data 7 to the information receiving apparatus 200 as one example of a distributing end. The contents distribution data 7 is a data with a format, for example, in FIG. 7(A).

The contents distributing data 7 is comprised of a contents classification C and quality Q as, for example, a header, the contents data 6 demanded by the information receiving apparatus 200 and billing information 41.

The contents classification C can a store 4 bits code. The contents classification Code of the contents classifications table 32 is written into the contents classification C based on a class of the contents of the contents data 6 by the contents processing unit 23.

The quality Q can store, for example, a 4 bits code. A code showing a rank of the quality division table 31 in FIG. 7(B) is written into the quality Q based on the quality of the contents of the contents data 6 by the contents processing unit 23. Therefore, the information receiving apparatus 200 has only to reproduce the contents data 6 by referring to the header.

Therefore, on the information receiving apparatus 200 side, even when the contents data 6 are various kinds of data, reproduction is carried out in accordance with the information of the header. Also, the information receiving apparatus 200 can have a prior knowledge of how much a bill will be charged by referring to the header.

The contents data 6 are data on, for example, the music information, the image information (moving images, still images, CG, photograph images or the like) and the like.

The billing information such as an amount of money and the like the information receiving apparatus 200 which receives the contents distributing data 7 has to pay in accordance with the contents classification C and the quality Q of contents data b is written into the billing information 41.

The above-mentioned charge adding up unit 49 is a processing unit for adding up a charge (sales in the case of the contents provider 35 in FIG. 1) of the contents data 6 for every information receiving apparatus 200 (otherwise, every contents provider 5 in FIG. 1). The charge adding up unit 49 has the sales transmitting unit 47 transmit a calculated usage rate for every information receiving apparatus 200 to the contents provider 35 by referring to the billing information table 51. That is, the contents provider 35 receives an amount of money for his sales to the contents data 6.

The information receiving apparatus 200 has a receiving unit 27 for receiving the contents distributing data 7 distributed from the information distributing apparatus 1. The receiving unit 27, at a time of receiving the contents distributing data 7, makes a demand in order to obtain desired contents. The information receiving apparatus 200 will be explained later.

The information distributing system 100 has the above-mentioned arrangement and next, its action (including a information distributing method) will be explained with reference to FIG. 1 to FIG. 7.

The user 33 is one who operates, for example, the information receiving apparatus 200. The user 33 feels inclined to listen to a desired piece of music and retrieves the music information registered in the information distributing apparatus 1. Various music information is registered in the information distributing apparatus 1. The music information is registered in the information distributing apparatus 1 by the contents provider 35 who makes, for example, the composition of music either a hobby or an occupation. The contents provider 35 demands the charge in exchange for a third party listening to the music he composed.

The user 33 demands a desired piece of music from the information distributing apparatus 1. To the demand, in the information distributing apparatus 1, the above-mentioned desired music information (hereafter, referred to as contents data 6) stored in the contents storing unit 43 is read by the contents processing unit 23. At this time, when the contents data 6 was registered in the information distributing apparatus 1 by the contents provider 35, the contents classification C of the contents data 6 may have been simultaneously registered. Meanwhile, the contents classification C may be later registered by the information distributing apparatus 1 side (the contents distribution service dealer 4 in FIG. 1).

The contents processing unit 23, depending on the above-mentioned contents classification C, conditions and the like (for example, the transmission speed) at a time of distributing from the information distributing apparatus 1, decides the quality Q of the contents data 6 and produces the contents distributing data 7 by adding the contents classification C, the quality Q and the billing information 41 like FIG. 7(A) to the contents data 6. The receiving and distributing unit 25 distributes the contents distributing data 7 to the information receiving apparatus 200. At this time, as a means for specifying the information distributing apparatus 200 of a distributing end, the receiving and distributing unit 25, when communication is carried out with, for example, a TCP/an IP (Transmission Control Protocol/Internet Protocol) as protocols, distributes an IP address and the like of the information receiving apparatus 200 as identifiers.

On the other hand, the contents processing unit 23, when the contents data 6 are distributed to the information receiving apparatus 200, notifies the usage rate adding up unit 19 of the fact. The usage rate adding up unit 19 charges the information receiving apparatus 200, or a receiving end of the contents distributing data 7 a usage rate in accordance with the value standard through, for example, the sales transmitting unit 47 in every predetermined period of time and pays the contents provider 35, or the provider of the contents data 6 for the sales in every predetermined period of time.

Figure 8:
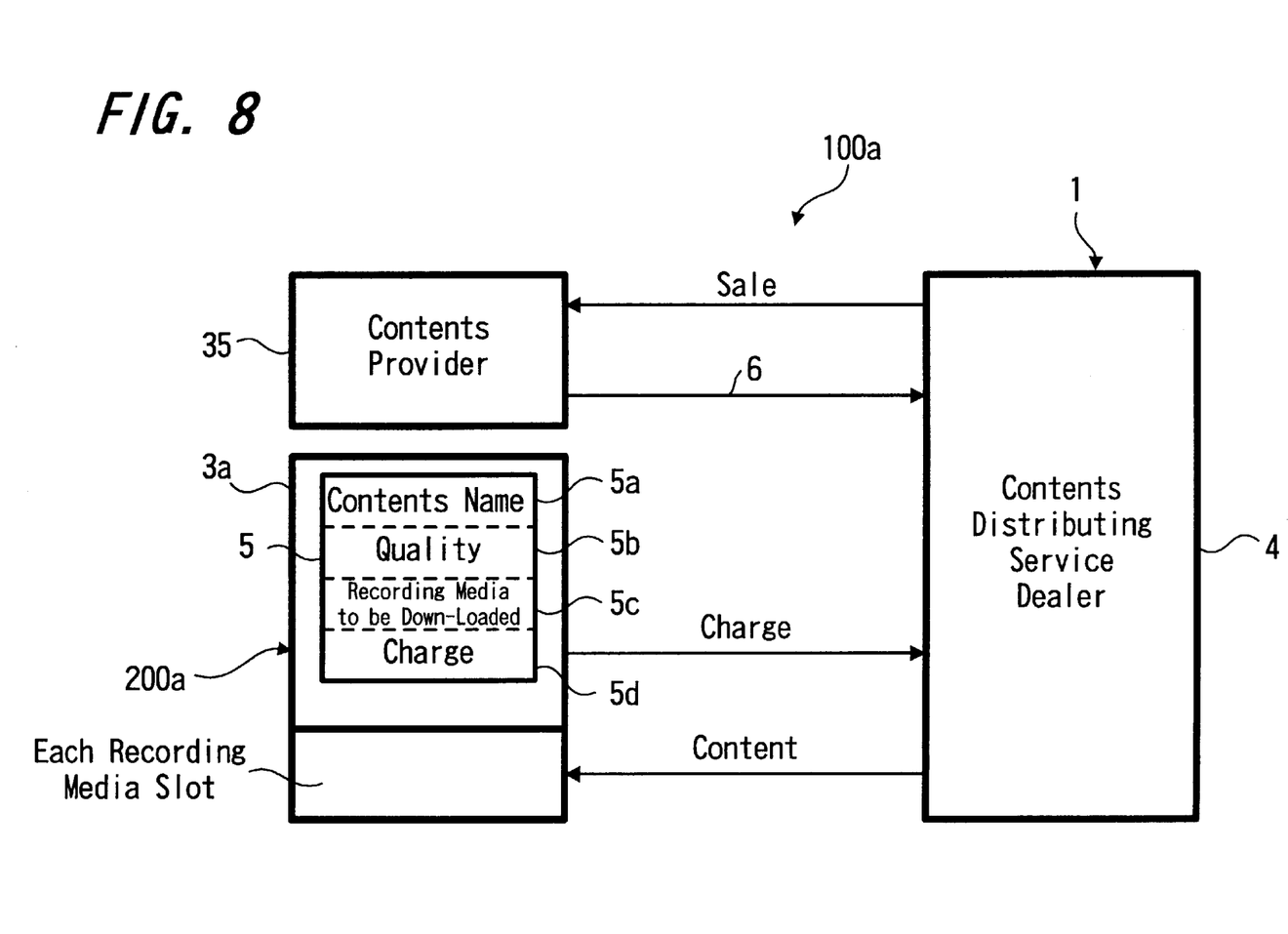
FIG. 8 is an image diagram showing an adapted example of the information receiving and distributing system including the information distributing apparatus in FIG. 1.

FIG. 8 is an image diagram showing an application example of the information receiving and distributing system apparatus including the above-mentioned information distributing apparatus.

In the information receiving and distributing system 100a in FIG. 8, an information receiving apparatus 200a (shop 3a) is deployed at, for example, a shop such as a convenience store or the like. In the information receiving apparatus 200a is provided a slot (recording apparatus) capable of writing information in a memory like PROMs (Programmable Read Only Memory) such as, for example, a CD-R (Compact Disc-Recordable), a minidisc, a RAM, a flash memory and the like and an information recording media (hereafter, referred to as a recording media) like a magnetic tape.

At the shop 3a, there is the contents data 6 distributed from the information distributing apparatus 1 and the billing can be changed depending on the contents data 6 which an arbitrary user takes possession of. For a user who has, for example, the minidisc as recording media, it follows that the contents data 6 is compressed and recorded by the information receiving apparatus 200a depending on the recording media (information recording media) and the quality is decided. Therefore, the billing information is decided at this point. When the recording media is, for example, the CD-R (Compact Disc-Recordable), the contents data 6 is recorded by way of a CD-DA (Compact Disc-Digital Audio) format without being compressed, and when it is the minidisc, it is recorded by way of the ATRAC format and when it is the RAM (or the PROM), it is recorded by way of the ATRAC2 format. Also, when the recording medium is the magnetic tape, the contents data 6 is put into an analog representation and recorded in the magnetic tape.

When the contents data 6 which are distributed by these applied examples are received by the information receiving apparatus 200 and recorded in arbitrary recording medium, the information receiving apparatus 200 is billed depending on the recording media. The user can obtain desired information in various recording media which are possessed by him. The information receiving apparatus 200 will be explained in detail in the following.

It is conceivable that the information receiving apparatus 200 has such a form which has, for example, the following functions.

Figure 9:
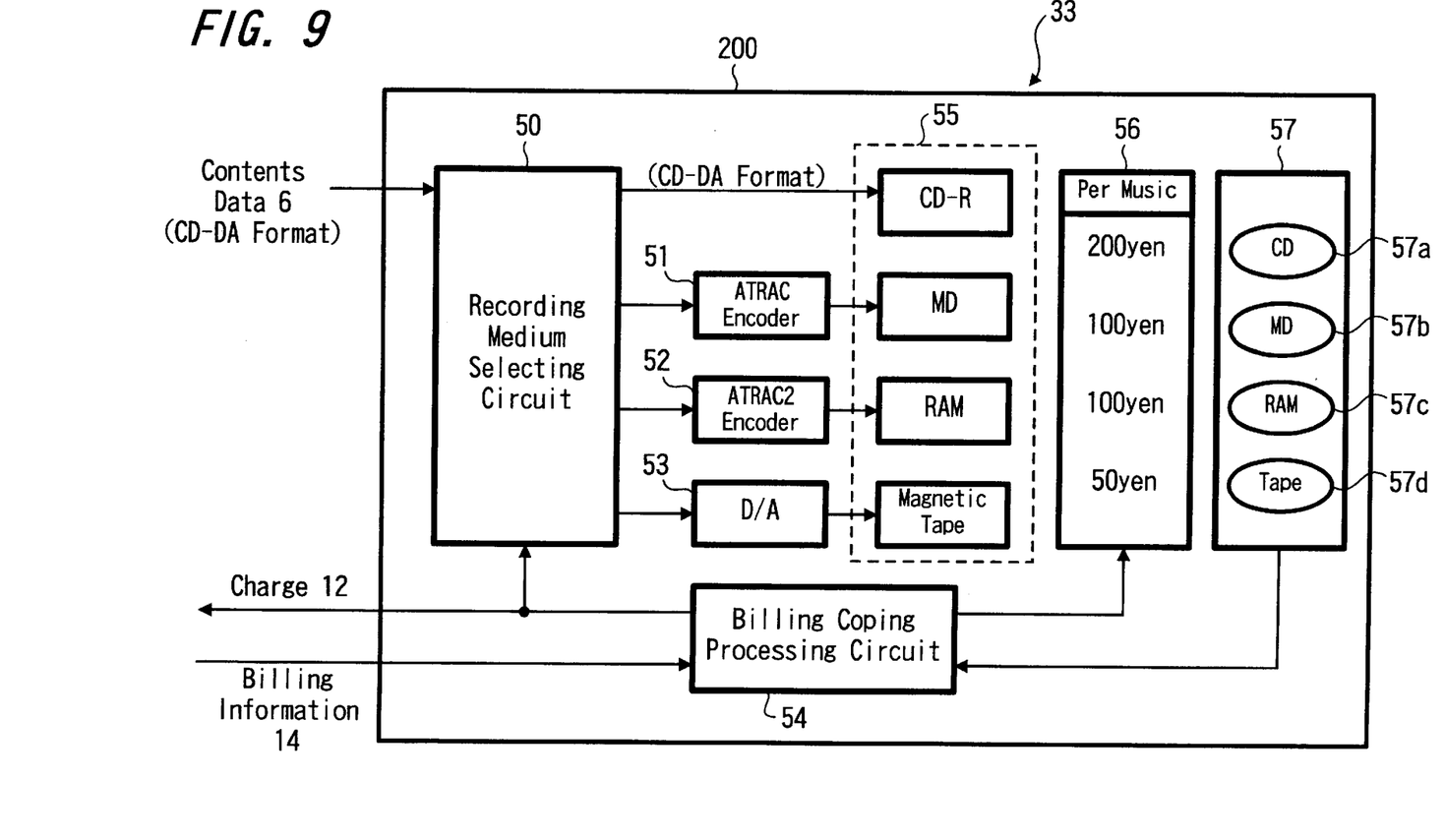
FIG. 9 is a block diagram showing an example of a functional arrangement of the information receiving apparatus in FIG. 6.

FIG. 9 is a block diagram showing an example of a functional arrangement of the information receiving apparatus in FIG. 6.

The information receiving apparatus 200 comprises, for example, a recording medium selecting circuit 50 (recording medium selecting means), an ATRAC encoder 51, an ATRAC 2 encoder 52, a D/A (Digital to Analog) converter 53 (hereafter, abbreviated as D/A), a recording apparatus 55 (recording means), a displayer 56, a key input unit 57 and a billing coping processing circuit 54 (billing coping means).

The information receiving apparatus 200 is one for receiving the contents data 6 with, for example, CD-DA (Compact Disc-Digital Audio) format.

The above-mentioned recording medium selecting circuit 50 is one for selecting which one of the information recording medium to record the recorded contents data 6 in. As the information receiving medium for recording the received contents data 6, it is possible to employ, for example, the CD-R, the minidisc (MD), the RAM or the magnetic tape. In the CD-R is directly recorded the contents data 6 with, for example, the CDDA format and in the minidisc is recorded the contents data 6 which is converted into a predetermined format by, for example, the ATRAC encoder 51 and in the RAM is recorded the contents data 6 which is converted to a predetermined format by, for example, the ATRAC2 encoder 52 and in the magnetic tape is recorded analog signal into which digital signal is converted by the D/A 53.

When a desired information recording media is selected by the recording media selecting circuit 50, in a case of the contents data 6 being on the music information, an amount of money per one piece of music such as [200 yen], [100 yen], [100 yen], and [50 yen], for example, for every recording medium is each displayed on the displayer 56. Also, in the information receiving apparatus 200 ordinarily in the vicinity of the displayer 56, and at positions corresponding to these displays of the amounts of money, there are provided, as the key input unit 57, for example, a CD button 57a, an MD button 57a, a RAM button 57c and a tape button 57d, respectively. Therefore, the user can select the desired information recording medium and record the above-mentioned contents data 6 in the information recording media.

The above-mentioned billing coping process circuit 54 displays the amount of money per the above-mentioned one piece of music in the displayer 56 based on the billing information 41 from the contents distributing service dealer 4, carries out the billing process in accordance with the information recording medium selected by the key input unit 57 and pays the usage rate 12 to the contents distributing service dealer 4.

According to the above-mentioned information receiving apparatus 200, the amount of money to be billed can be made different depending on the information recording medium for recording the contents data 6.

Figure 10:
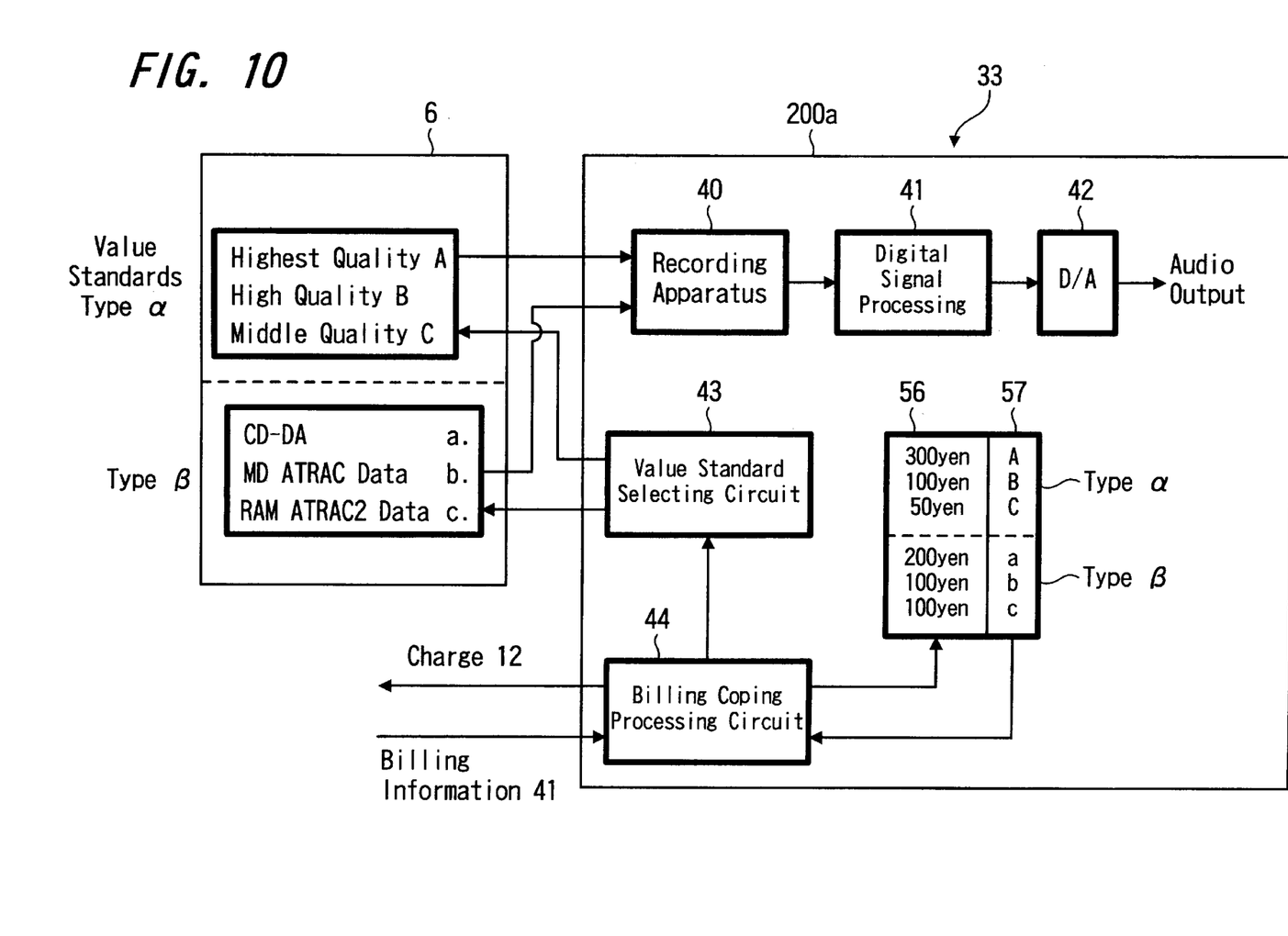
FIG. 10 is a block diagram of a modified example of the functional arrangement of the information receiving apparatus in FIG. 9.

FIG. 10 is a block diagram showing an example of a modification of the functional arrangement of the information receiving apparatus in FIG. 9.

The information receiving apparatus 200a receives the contents data 6 which are provided at the contents distributing service dealer 4 in FIG. 1 and have classes of predetermined value standards (type α and β). Further, in the type a of the contents data 6 are provided the highest quality A, high quality B and medium quality C and in the type β are provided CD-DA data, ATRAC data for the minidisc (MD) and ATRAC2 data for the RAM.

The information receiving apparatus 200a comprises, for example, a recording apparatus 40, a digital signal processing 41, a D/A 42, a value standard selecting circuit 43 (information selecting means), a billing coping processing circuit 44 (information billing means), a displayer 56 and a key input unit 57.

The billing coping processing circuit 44 receives the billing information 41 in FIG. 10 from the contents distributing service dealer 4 in FIG. 1 and displays its contents in the displayer 56. The user selects the billed amount of money (in FIG. 10, in a case of the type a, [300 yen], [100 yen], [50 yen] and in a case of the type P, [200 yen], [100 yen], [100 yen]) based on the respective value standards displayed in the displayer 56. The value standard selecting circuit 43 notifies the contents distributing service dealer 4 in FIG. 1 based on the selected value standard. The contents data 6 provided at the contents distributing service dealer 4 in FIG. 1 are recorded in the recording apparatus 40.

Digital signal processing 41 carries out signal processing on the contents data 6 recorded by the recording apparatus 40 such as an error correcting process, an expansion process for the compressed data, and the like and the processed data is further D/A-converted by the D/A 42 to be, for example, audio-outputted.

According to the above-mentioned information receiving apparatus 200a, the billed amount of money is made different depending on the value standards of the contents data 6 obtained.

According to the embodiments of the present invention, in the information distributing apparatus 1, the contents processing unit 23 adds the header (contents classification C and the quality Q) to the contents data 6 as the standard for judging the value based on the predetermined standards. The header added to the contents data 6 by the contents processing unit 23 is referred to at a time of billing the information distributed by the receiving and distributing unit 25. The contents processing 23 adds the billing information 41 to the contents data 6 based on the header. Therefore, the information distributing apparatus 1 has the contents distributing data 7 which have been processed into a plurality of quality from the same contents data 6 and can distributes the data 7 by having each of them carry the billing information 41 corresponding to each to the user 33 in FIG. 1.

Accordingly, based on the class and quality as the value standards of the provided information, it is possible to carry out the billing of the side to which the information is provided. That is, it is possible to obtain the contents data 6 which is billed in accordance with the quality and the like in response to the demand by the user himself. On the user 33 side, high quality information can be obtained at a high price and low quality information can be obtained at a low price. On the other hand, on the contents provider side, since the high quality information is not provided to the user 33 at a lower price, he can feel relieved from the standpoint of a copy right. On the contents provider side, a range of choices of the contents 6 can be expanded.

By the way, the present invention is not limited to the above-mentioned embodiments.

A form may also be good in which the information receiving apparatus 200 in FIG. 1 is disposed in, for example, shops and the like.

The contents classification C and the quality Q as the header of the contents distributing data 7 are illustrated as respectively being 4 bits in FIG. 7(A), but it is all right to prepare necessary numbers of bits for respective necessary numbers of divisions. Also, the header may be omitted when provision of exclusively intended information about, for example, a specified kind of information on music or the like is carried out.

As explained up to now, according to the present invention, it is possible to provide the information distributing apparatus and the information distributing method, the information receiving apparatus and the information receiving method as well as the information receiving and distributing method, which are capable of carrying out the billing of the side to which the information is provided based on the value standard of the provided information.

Having described preferred embodiments of the present invention with reference to the accompanying drawings, it is to be understood that the present invention is not limited to the above-mentioned embodiments and that various changes and modifications can be effected therein by one skilled in the art without departing from the spirit or scope of the present invention as defined in the appended claims.

What is claimed is:

1. Information distributing apparatus comprising:
   providing means for providing selectable rankings of content information to be distributed to a user,
   said rankings being distinguished by a trait of said content information and selectable by said user,
   said trait selected from the group consisting of quality and class of said content information to be distributed;
   billing means for providing billing information based on said rankings of said content information and type of recording medium selectable by the user for recording said content information, said billing information including first cost information associated with a first type of recording medium and second cost information, different than the first cost information, associated with a second type of recording medium;

adding means for adding said rankings and said billing information to said content information so to generate a contents distributing data packet; and distributing means for distributing to said user said contents distributing data packet.

2. Information distributing apparatus as claimed in claim 1, wherein said trait is quality of said content information distributed to said user.

3. Information distributing apparatus as claimed in claim 1, wherein said trait is class of said content information distributed to said user.

4. Information distributing apparatus as claimed in claim 1 wherein said quality is transmission speed at which said content information is distributed by said distributing means.

5. Information distributing apparatus as claimed in claim 1, wherein said quality is a degree of compression of said content information distributed by said distributing means.

6. Information distributing apparatus as claimed in claim 1, wherein high rankings are billed at a high billing rate, and low rankings are billed at a low billing rate.

7. Information distributing apparatus as claimed in claim 1, wherein said distributing means selectively distributes said content information by a communications satellite, radio communication, cable communication or the internet, or combination thereof.

8. Information distributing method comprising the steps of:

providing selectable rankings of content information to be distributed to a user, said rankings being distinguished by a trait of said content information and selectable by said user, said trait selected from a group consisting of quality and class of said content information to be distributed;

providing billing information based on said rankings of said content information and type of recording medium selectable by the user for recording said content information, said billing information including first cost information associated with a first type of recording medium and second cost information, different than the first cost information, associated with a second type of recording medium, adding said rankings and said billing information to said content information so to generate a contents distributing data packet; and distributing to said user said contents distributing data packet.

9. Information distributing method as claimed in claim 8, wherein said trait is quality of said content information distributed to said user.

10. Information distributing method as claimed in claim 8, wherein said trait is class of said content information distributed to said user.

11. Information distributing method as claimed in claim 8, wherein said quality is transmission speed at which said content information is distributed to said user.

12. Information distributing method as claimed in claim 8, wherein said quality is a degree of compression of said content information distributed to said user.

13. Information distributing method as claimed in claim 8, wherein high rankings are billed at a high billing rate, and low rankings are billed at a low billing rate.

14. Information distributing method as claimed in claim 8, wherein said content information is selectively distributed by a communications satellite, radio communication, cable communication or the internet, or combination thereof.

* * * * *